M. TIBBETTS.
MOTOR VEHICLE.
APPLICATION FILED JUNE 19, 1918.
1,305,030.
Patented May 27, 1919.
2 SHEETS—SHEET 1.
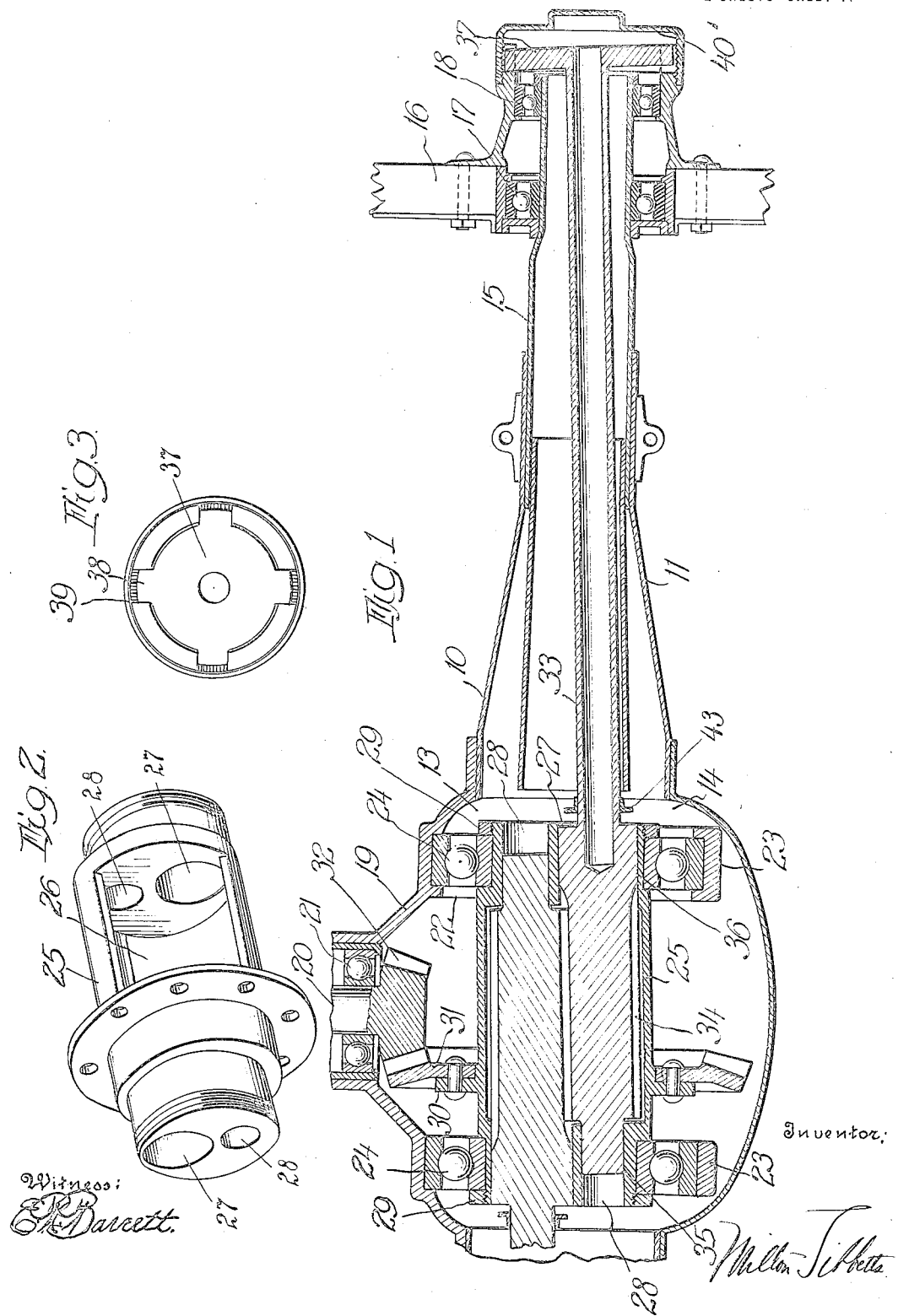

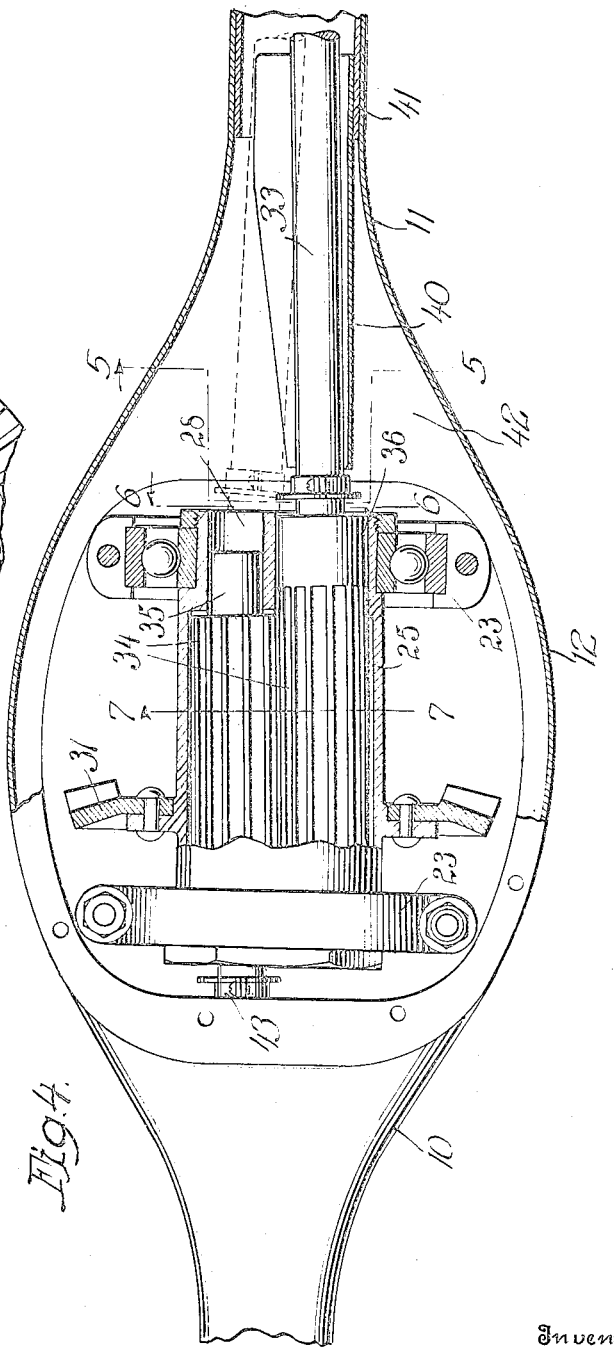

UNITED STATES PATENT OFFICE.

MILTON TIBBETTS, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,305,030.  Specification of Letters Patent.  Patented May 27, 1919.

Application filed June 19, 1916. Serial No. 104,461.

*To all whom it may concern:*

Be it known that I, MILTON TIBBETTS, a citizen of the United States, and resident of Detroit, Wayne county, State of Michigan, have invented certain new and useful Improvements in Motor-Vehicles, of which the following is a specification.

This invention relates to motor vehicles and particularly to driving axles therefor. One of the objects of the invention is to provide a light and efficient axle and differential mechanism.

Another object of the invention is to improve upon the form of axles which employ what may be called a "two gear differential mechanism."

Another object of the invention is to provide a suitable oil retaining means within a motor vehicle axle in which a so-called two gear differential mechanism is employed.

Another object of the invention is to improve upon the form and construction of the axle sections of an axle employing a two gear differential mechanism.

Other objects of the invention will appear from the following description, taken in connection with the drawings which form a part of this specification, and in which Figure 1 is a horizontal, longitudinal section through a driving axle embodying this invention.

Fig. 2 is a perspective view of the differential housing shown in Fig. 1.

Fig. 3 is an end view of the axle shown in Fig. 1, the hub cap being removed.

Fig. 4 is a vertical longitudinal section and part elevation of the axle shown in Fig. 1, the differential housing and axle sections having been turned ninety degrees.

Fig. 5 is a transverse section on the line 5—5 of Fig. 4, with the axle section in dotted line position;

Fig. 6 is a transverse section on the line 6—6 of Fig. 4, the bearings however not being shown; and Fig. 7 is a transverse section on the line 7—7 of Fig. 4.

Referring to the drawings, 10 represents generally an axle casing comprising a main central part 11 having an enlarged portion 12 in which are forward and rear openings 13 and 14 respectively, and end parts 15 upon which the driving wheels 16 are mounted to rotate as by the bearings 17, 18.

The front opening 13 of the enlarged middle portion of the axle casing is closed by a detachable cover 19, in which the driving or propeller shaft 20 of the vehicle is mounted as in bearings 21. This cover 19 has inwardly extended lugs 22 and detachable caps 23 in which are mounted a pair of spaced ball bearings 24 for a differential housing 25. This housing is shown best in Fig. 2 and it will be seen that it is in the form of a cylinder having openings 26 therein, and at each end there are a pair of openings 27, 28, which form bearings for the axle sections hereinafter described. The bearings 24 surround the ends of the differential housing and are held thereon as by nuts 29. Intermediate its ends, the differential housing 25 is also formed with an annular flange 30 to which is secured as by riveting or otherwise a driven bevel gear 31 which meshes with a driving pinion 32 on the propeller shaft 20.

It will be observed that the opening 27 in one end of the differential housing is axially in line with the opening 28 in the other end, and all of these openings are offset from the rotative axis of the differential housing and are at a slight angle thereto. In fact, the axes of these openings are parallel to each other and if extended they would intersect the axis of the axle casing, or the rotative axis of the wheels 16, at the outer ends of the wheel hubs. Also it will be seen that the opening 27 in each case is larger than its alined opening 28, and the former is large enough to admit the enlarged end of one of the two axle sections 33. As shown, these axle sections are tubular in form throughout the greater part of their length, and each of them is formed at its inner end with a spur gear 34, the gears of these axle sections being in mesh within the differential housing. Each axle section is also formed with an end bearing part 35 which takes a bearing in the opening 28, and with a larger bearing part 36, which is in fact as large as or larger than the diameter of the gear 34, and takes a bearing in the opening 27. With this construction it will be seen that the axle sections may be inserted into and withdrawn from the differential housing without disturbing the bearings or mountings or any other parts thereof.

The outer end of each axle section 33 is in the form of a flange 37 having peripheral teeth 38 which are adapted to enter notches 39 cut in the outer end of the hub of the wheel 16. A cap 40' screwed onto the end of the wheel hub retains the axle section in place.

With the above construction it will be observed that the wheels 16 are connected by a two gear differential mechanism, which comprises the two intermeshing spur gears 34, the axle sections 33 upon which the gears are formed, and the universal joints formed by the outer ends of the axle sections and the wheel hubs. Thus the inner ends of the axle sections are slightly offset from the center of the axle and by reason of their gear connection, they are adapted to be rotated by the gear 31 either together or differentially.

For the purpose of preventing the oil that is always used in an axle of this character from running out of the ends of the axle when the latter is tipped somewhat while in use, a guard 40 is provided on each side of the differential housing, such guard extending inwardly from its point of attachment to the axle casing at 41 toward the differential housing. This guard 40 forms an oil pocket 42 so that the oil is caught therein as the axle is tipped and it returns to the middle of the large portion of the axle casing when the latter returns to horizontal position.

As shown, the guard 40 does not extend entirely around the axle section, but is cut away on its upper side for the purpose of permitting the ready removal of the axle section 33 endwise. Thus in Fig. 4 the differential housing may be turned so that the right hand axle section 33 is in the position shown in dotted lines, and the axle section may then be drawn outwardly without in any way interfering with the guard 40. By turning the differential housing 180 degrees from that position, or to the position in which it is now shown in full lines in Fig. 4, the left hand axle section may be removed in like manner.

For the purpose of further preventing the escape of oil from the middle portion of the axle casing, a throw-off ring 43 may be secured about each of the axle sections just inwardly of the inner end of the guard 40. Thus any oil that may escape from the bearing portion 36 of the axle section will be thrown from the section by centrifugal force before it reaches the guard 40.

It will be understood that other forms of the invention may be made without departing from the spirit or scope of the invention.

I claim—

1. In a motor vehicle axle, in combination, an axle casing, a differential housing in the form of an integral cylinder having openings in its sides, bearings surrounding the ends of said housing and mounted in said casing, said housing having two bearing openings in each end offset from the axis thereof, and axle sections extending into the ends of said housing and having a bearing in said openings.

2. In a motor vehicle axle, in combination, an axle casing, a differential housing in the form of an integral cylinder having openings in its sides, bearings surrounding the ends of said housing and mounted in said casing, said housing having two bearing openings in each end offset from the axis thereof, and axle sections having gears at their inner ends and extending into the ends of said housing, the gears of said sections being adapted to mesh, and said sections formed to have a bearing in said openings on each side of said gears.

3. In a motor vehicle axle, in combination, an axle casing, a differential housing therein, wheels mounted at the ends of the axle, and a pair of axle sections each connected to drive one of said wheels and extending into said differential housing with their inner ends slightly offset relatively, said axle sections having their inner ends formed with intermeshing gears, and with bearing surfaces on both sides of said gears, one of said bearing surfaces being as large as the gear.

4. In a motor vehicle axle, in combination, an axle casing having a middle enlarged portion, a differential housing therein, a pair of axle sections extending into said housing and having their inner ends relatively offset, and an oil guard on each side of and extending inwardly toward said housing and cut away on one side to permit withdrawal of the axle sections through the outer ends of the axle.

5. In a motor vehicle axle, in combination, an axle casing having a middle enlarged portion, a differential housing therein, a pair of axle sections extending into said housing and having their inner ends relatively offset, and an oil guard on each side of and extending inwardly toward said housing and cut away on its upper side to permit the axle section when turned to one position to be withdrawn through the outer ends of the axle.

6. In a motor vehicle axle, in combination, an axle casing having a middle enlarged portion, a differential housing mounted in bearings therein, axle sections extending into said housing, throw-off rings on said axle sections, and guards under the axle sections and extending inwardly to a point adjacent said rings.

7. In a motor vehicle axle, in combination, an axle casing, a one piece differential housing supported on bearings therein, and differential gears in said housing.

8. In a motor vehicle axle, in combination, an axle casing, a differential housing supported in bearings therein, said housing being a single piece of substantially cylindrical form, and differential gears mounted in said housing.

9. In a motor vehicle axle, in combination, an axle casing, a differential housing supported in bearings therein, said housing being a single piece of substantially cylindrical form, and a pair of intermeshing differential gears mounted in said housing with their axes lengthwise of the axle.

In testimony whereof I affix my signature.

MILTON TIBBETTS.